United States Patent
Bar-Shalom et al.

(10) Patent No.: US 7,827,323 B2
(45) Date of Patent: Nov. 2, 2010

(54) SYSTEM AND METHOD FOR PERIPHERAL DEVICE COMMUNICATIONS

(75) Inventors: Ofer Bar-Shalom, Kiryat Ono (IL); Mark N. Fullerton, Austin, TX (US); Alon Tsafrir, Hod Hasharon (IL)

(73) Assignees: Marvell Israel (M.I.S.L.) Ltd., Yokneam (IL); Barvell World Trade Ltd., St. Michael (BB)

( * ) Notice: Subject to any disclaimer, the term of this patent is extended or adjusted under 35 U.S.C. 154(b) by 253 days.

(21) Appl. No.: 11/953,552

(22) Filed: Dec. 10, 2007

(65) Prior Publication Data

US 2008/0140878 A1  Jun. 12, 2008

Related U.S. Application Data

(60) Provisional application No. 60/869,166, filed on Dec. 8, 2006, provisional application No. 60/887,482, filed on Jan. 31, 2007.

(51) Int. Cl.
*G06F 13/28* (2006.01)
*G06F 13/24* (2006.01)

(52) U.S. Cl. ........................................ 710/22; 710/262
(58) Field of Classification Search ................... 710/22, 710/262
See application file for complete search history.

(56) References Cited

U.S. PATENT DOCUMENTS

| | | | |
|---|---|---|---|
| 5,809,334 A | 9/1998 | Galdun et al. | |
| 5,948,080 A | 9/1999 | Baker | |
| 6,092,116 A | 7/2000 | Earnest et al. | |
| 7,287,101 B2* | 10/2007 | Futral et al. | 710/22 |
| 7,490,258 B2* | 2/2009 | Sakamoto et al. | 713/600 |
| 7,516,903 B2* | 4/2009 | Nishizawa et al. | 235/492 |
| 2004/0064606 A1 | 4/2004 | Kimura | |
| 2005/0033874 A1 | 2/2005 | Futral et al. | |
| 2006/0106949 A1 | 5/2006 | Nicolson et al. | |
| 2006/0218324 A1* | 9/2006 | Zayas | 710/65 |
| 2006/0224804 A1* | 10/2006 | Alexandre | 710/110 |
| 2007/0233907 A1* | 10/2007 | Yoshikawa et al. | 710/26 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner*—Alford W Kindred
*Assistant Examiner*—Chun-Kuan Lee

(57) ABSTRACT

A host device includes a peripheral control module that includes a first memory register that receives data from a first memory and a direct memory access (DMA) module that communicates with the first memory. The host device also includes a host control module that receives data from the first memory. The host device also includes a DMA control module that communicates with the first memory register, the host control module and a second memory that includes a first memory array. The DMA control module compares contents of the first memory array to contents of the memory register and controls transfers of data from the first memory to the peripheral control module based on the comparison.

42 Claims, 15 Drawing Sheets

OTHER PUBLICATIONS

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Information technology-Telecommunications and information exchange between systems-Local and metropolitan area networks-Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

Notification of Transmittal of The International Search Report and The Written Opinion of the International Searching Authority, or The Declaration for International Application No. PCT/IB2007/003849; dated May 7, 2008; filed Dec. 10, 2007, 12 pgs.

\* cited by examiner

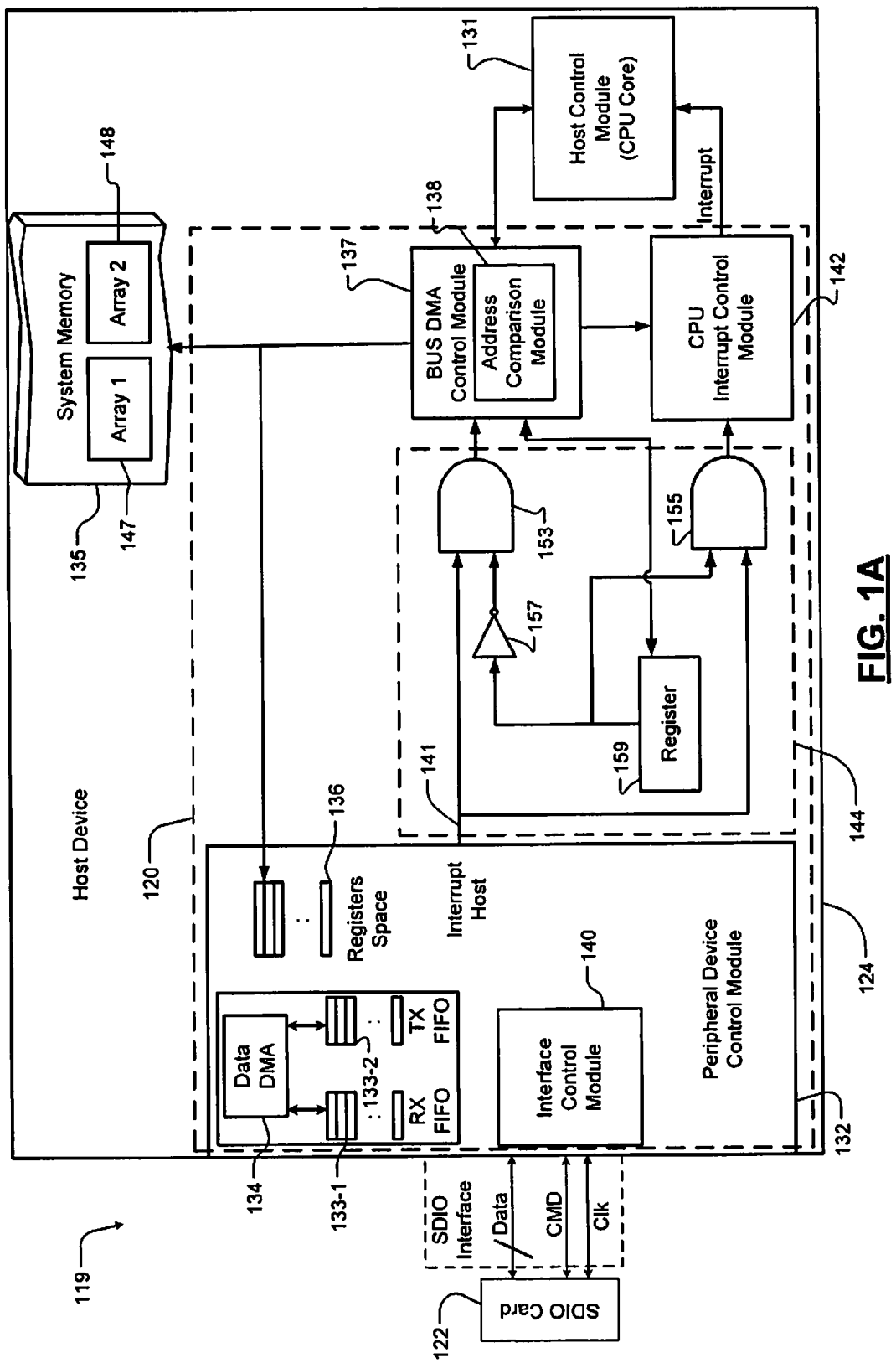

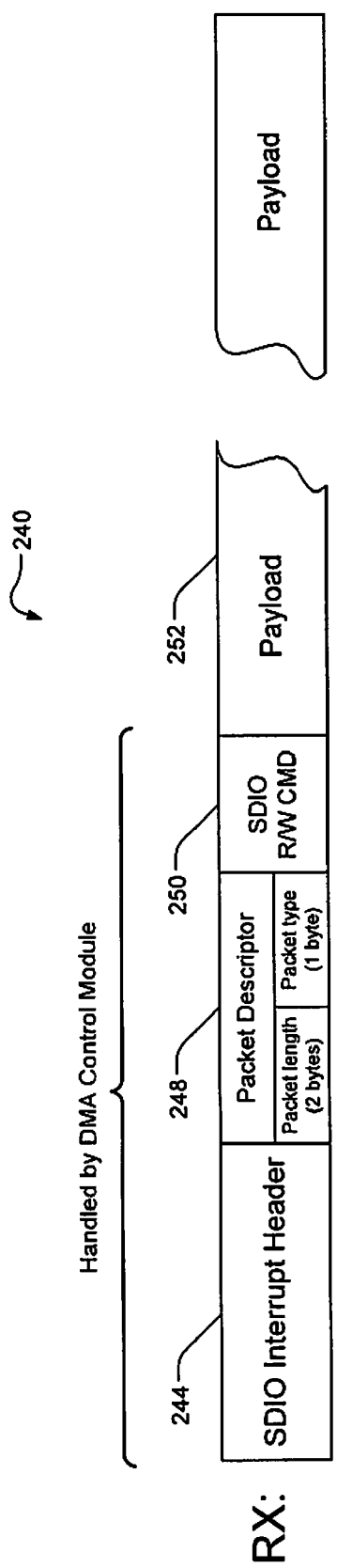
FIG. 4
FIG. 5

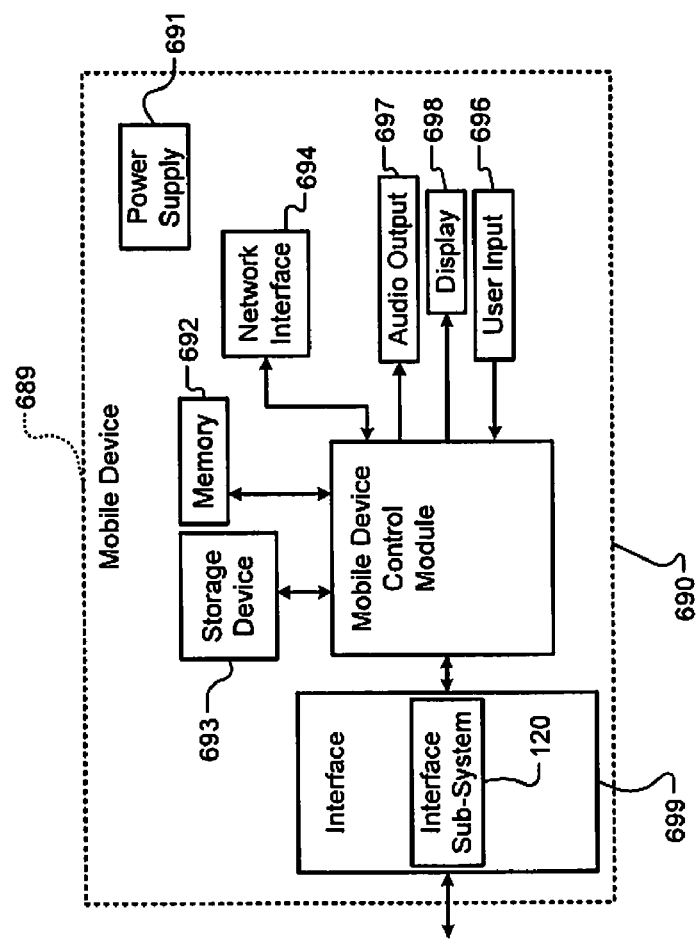
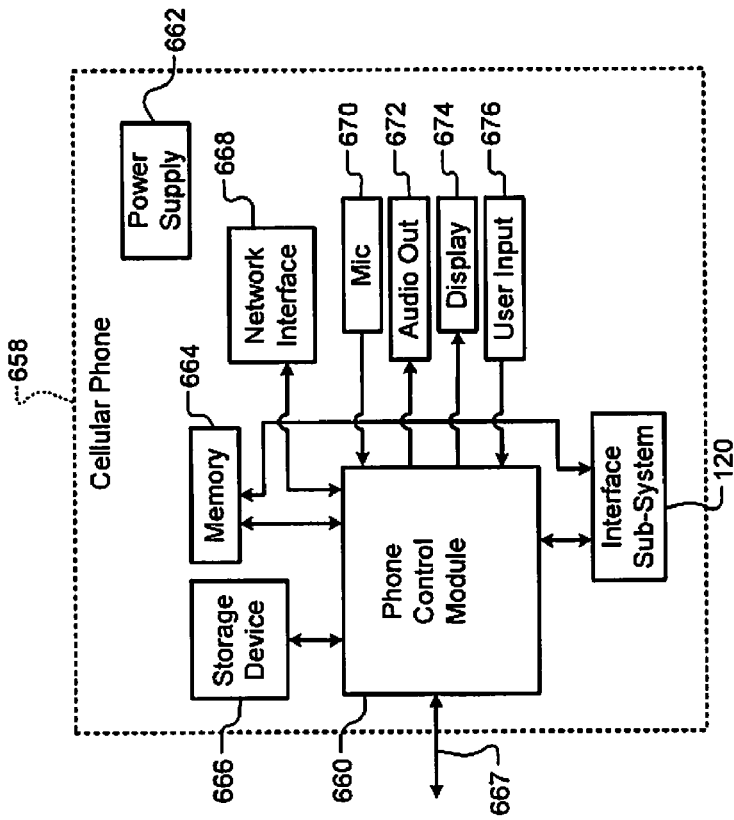

SYSTEM AND METHOD FOR PERIPHERAL DEVICE COMMUNICATIONS

CROSS-REFERENCE TO RELATED APPLICATIONS

This application claims the benefit of U.S. Provisional Application Nos. 60/887,482, filed Jan. 31, 2007, and 60/869,166, filed Dec. 8, 2006. The disclosure of the above application is incorporated herein by reference in its entirety.

FIELD

The present disclosure relates to data communications and more particularly to data communications between a peripheral device and a host device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Mobile devices such as laptop computers, personal digital assistants (PDAs), digital video devices, cellular phones, digital cameras, and portable audio devices may be referred to collectively as "host devices". Host devices may be equipped with interface modules to communicate with peripheral devices, for example integrated circuit (IC) cards.

The interface modules may be, for example, Secure Digital (SD) interface modules, and the cards may be, for example, SD cards. SD cards may operate according to international standards such as the SD memory standard for memory devices and the SD input/output (SDIO) standard for input/output devices.

SUMMARY

A host device includes a peripheral control module that includes a first memory register that receives first data from a first memory and a direct memory access (DMA) module that communicates with the first memory. The host device also includes a host control module that receives second data from the first memory. The host device also includes a DMA control module that communicates with the first memory register, the host control module and a second memory that includes a first memory array. The DMA control module compares contents of the first memory array to contents of the memory register and controls transfers of first or second data from the first memory to the peripheral control module based on the comparison.

In other features, the transfer of first data is performed without interruption of non-memory processes that are performed by the host control module. The first data includes overhead data and the second data includes payload data. The DMA control module transfers the first data from the first memory to the peripheral control module when the contents of the first memory array match the contents of the first memory register.

In other features, the host device includes an interrupt control module that communicates with the DMA control module and that passes interrupts to the host control module when the contents of the first memory array do not match the contents of the first memory register. The host control module controls the transfers of first or second data in response to the interrupts.

In other features, the host device includes a logic circuit. The peripheral control module communicates with the DMA control module and the interrupt control module through the logic circuit. The logic circuit selectively passes the interrupts from one of the peripheral control module, the DMA control module and the interrupt control module. The peripheral control module includes a secure digital input/output (SDIO) control module. The host control module defines a source memory address in the first memory, a destination memory address in the second memory and a size of the data to be transferred.

In other features, an interface system includes the host device and a peripheral device that is controlled by the peripheral control module and that includes the first memory. The transfer of data includes a transfer of a block of data from the first memory to the first memory register. The peripheral device is outside a boundary of the host device. The peripheral device communicates with the host device via a secure digital input/output (SDIO).

In other features, the host control module prepares the first array and a second array in the second memory. The host control module directs the DMA control module to communicate with the first and second arrays. The first array includes a sequence of expected responses from the peripheral device and the second array includes a sequence of commands to be executed by the peripheral device. When the peripheral device includes a data packet to be read by the host device, the peripheral device triggers an interrupt. The DMA control module services the interrupt by copying a first command in the second array to a second register in the peripheral device control module.

In other features, the peripheral device receives the first command and responds to the command with a response token. The peripheral device sends the response token to the first register. The peripheral device control module triggers an interrupt in response to the response token that is serviced by the DMA control module. Packets include the first and second data. The peripheral control module receives packets in chunks of predetermined size. The peripheral device determines a length of the packets based on a number of data chunks over which the packets are to be read out of said peripheral device. A last one of the commands at least partially refers to said length.

In other features, a host device includes a direct memory access (DMA) control module. A host control module of the host device includes a communication module that communicates via packets with a peripheral device. The packets have header portions and data/payload portions. A DMA interface module of the host device initiates predetermined command sequences in the DMA control module based on the header portions. The DMA control module transmits commands and receives responses from the peripheral device based on the predetermined command sequence. The DMA control module notifies the host control module after the peripheral device responds to the commands.

In other features, the header portion includes an interrupt header. The command sequence includes a plurality of descriptors that identify locations in the memory for the commands. The DMA control module retrieves the commands based on the descriptors. The commands are standard secure digital input/output (SDIO) commands. The host device includes a secure digital (SD) control module. The DMA and host control modules communicate with the peripheral device through the SD control module.

In other features, an interface system includes the host device and further includes the peripheral device. The peripheral device includes at least one of a secure digital (SD) card, a SD input/output (SDIO) card, and a multi-media control (MMC) card. The SDIO card includes a radio frequency (RF) transceiver module and an antenna that communicates with the RF transceiver module. The RF transceiver module is compliant with at least one of IEEE standards 802.11, 802.11a, 802.11b, 802.11g, 802.11h, 802.11n, 802.16, 802.20 and Bluetooth.

In other features, a method for operating an interface system includes receiving first data from first memory of a peripheral device in a first register of a peripheral control module of a host device. The method also includes comparing contents of a first memory array in second memory of the host device to contents of the first register without interrupting non-memory processes of a host control module of the host device. The method also includes controlling transfers of second data from the first memory to the peripheral control module based on the comparison.

In other features, the method includes transferring the first data from the first memory to the peripheral control module when the contents of the first memory array match the contents of the first register. The method also includes passing interrupts to the host control module when the contents of the first memory array do not match the contents of the first memory register.

In other features, the method includes controlling the transfers of second data in response to the interrupts. The method also includes selectively passing the interrupts from one of the peripheral control module, a direct memory access (DMA) control module that controls the comparing, and an interrupt control module that controls the interrupting. The peripheral control module includes a secure digital input/output (SDIO) control module.

In other features, the method includes defining a source memory address in the first memory, a destination memory address in the second memory and a size of the data to be transferred. The method also includes using secure digital input/output (SDIO) to transfer data between the peripheral device and the host device. The method also includes preparing the first array and a second array in the second memory. The method also includes directing a DMA control module to communicate with the first and second arrays.

In other features, the first array includes a sequence of expected responses from the peripheral device and the second array includes a sequence of commands to be executed by the peripheral device. The method also includes triggering an interrupt when the peripheral device includes a data packet to be read by the host device. The method also includes servicing the interrupt by copying a first command in the second array to a second register in the peripheral device control module. The peripheral device receives the first command, and responds to the command with a response token. The method includes sending the response token to the first register. The method also includes triggering an interrupt that is serviced by the DMA control module in response to the response token.

In other features, a method for interfacing includes transferring packets from a peripheral device to a direct memory access (DMA) control module. The packets have header portions and payload portions. The method also includes initiating predetermined command sequences in the DMA control module based on the header portions. The method also includes transmitting commands and receiving responses from the peripheral device based on the predetermined command sequence. The method also includes notifying the host control module after the peripheral device responds to the commands.

In other features, the header portion includes an interrupt header. The method also includes identifying locations in the memory with a plurality of descriptors for the commands that are in the command sequence. The method also includes retrieving the commands based on the descriptors. The commands are standard secure digital input/output (SDIO) commands. The peripheral device includes at least one of a secure digital (SD) card, a SD input/output (SDIO) card, and a multi-media control (MMC) card. The SDIO card includes a radio frequency (RF) transceiver module and an antenna that communicates with the RF transceiver module. The RF transceiver module is compliant with at least one of IEEE standards 802.11, 802.11a, 802.11b, 802.11g, 802.11h, 802.11n, 802.16, 802.20 and Bluetooth.

In other features, a host device includes peripheral control means for controlling peripheral communications that includes first register means for receiving data from first memory means for storing data and direct memory access (DMA) means for communicating with the first memory means. The host device also includes host control means for receiving data from the first memory means. The host device also includes DMA control means for communicating with the first register means, the host control means and second memory means for storing data that includes a first data array. The DMA control means compares contents of the first data array to contents of the register means for storing data and controls transfers of data from the first memory means to the peripheral control means based on the comparison.

In other features, the transfer of data is performed without interruption of non-memory processes that are performed by the host control means. The DMA control means transfers the data from the first memory means to the peripheral control means when the contents of the first data array match the contents of the first register means.

In other features, the host device includes an interrupt control means for communicating with the DMA control means and for passing interrupts to the host control means when the contents of the first data array do not match the contents of the first register means. The host control means controls the transfers of data in response to the interrupts.

In other features, the peripheral control means communicates with the DMA control means and the interrupt control means through logic means for selectively passing the interrupts from one of the peripheral control means, the DMA control means and the interrupt control means. The peripheral control means includes a secure digital input/output (SDIO) control means for communicating securely. The host control means defines a source memory address in the first memory means, a destination memory address in the second memory means and a size of the data to be transferred.

In other features, an interface system includes the host device and a peripheral device that is controlled by the peripheral control means and that includes the first memory means. The transfer of data includes a transfer of a block of data from the first memory means to the first register means. The peripheral device is outside a boundary of the host device. The peripheral device communicates with the host device via a secure digital input/output (SDIO).

In other features, the host control means prepares the first data array and a second data array in the second memory means. The host control means directs the DMA control means to communicate with the first and second arrays. The first array includes a sequence of expected responses from the peripheral device and the second array includes a sequence of commands to be executed by the peripheral device. When the peripheral device includes a data packet to be read by the host device, the peripheral device triggers an interrupt. The DMA control means services the interrupt by copying a first command in the second array to a second register in the peripheral device control means.

In other features, the peripheral device receives the first command and responds to the command with a response token. The peripheral device sends the response token to the first register. The peripheral device control means triggers an interrupt in response to the response token that is serviced by the DMA control means.

In other features, a host device includes direct memory access (DMA) control means for communicating with memory. A host control means of the host device includes communication means for communicating via packets with a peripheral device. The packets have header portions and payload portions. The host device also includes DMA interface means for initiating predetermined command sequences in the DMA control means based on the header portions. The DMA control means transmits commands and receives responses from the peripheral device based on the predetermined command sequence. The DMA control means notifies the host control means after the peripheral device responds to the commands.

In other features, the header portion includes an interrupt header. The command sequence includes a plurality of descriptors that identify locations in the memory means for the commands. The DMA control means retrieves the commands based on the descriptors. The commands are standard secure digital input/output (SDIO) commands. The host device includes secure digital (SD) control means for communicating. The DMA and host control means communicate with the peripheral device through the SD control means.

In other features, an interface system includes the host device and further includes the peripheral device. The peripheral device includes at least one of a secure digital (SD) card, a SD input/output (SDIO) card, and a multi-media control (MMC) card. The SDIO card includes radio frequency (RF) transceiver means for transmitting and receiving signals and antenna means for communicating with the RF transceiver means. The RF transceiver means is compliant with at least one of IEEE standards 802.11, 802.11a, 802.11b, 802.11g, 802.11h, 802.11n, 802.16, 802.20 and Bluetooth.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a block diagram of a receive path packet;

FIG. 5 is a block diagram of a transmit path packet;

FIG. 13E is a functional block diagram of a cellular phone; and

FIG. 13F is a functional block diagram of a mobile device.

DETAILED DESCRIPTION

Figure 1B:
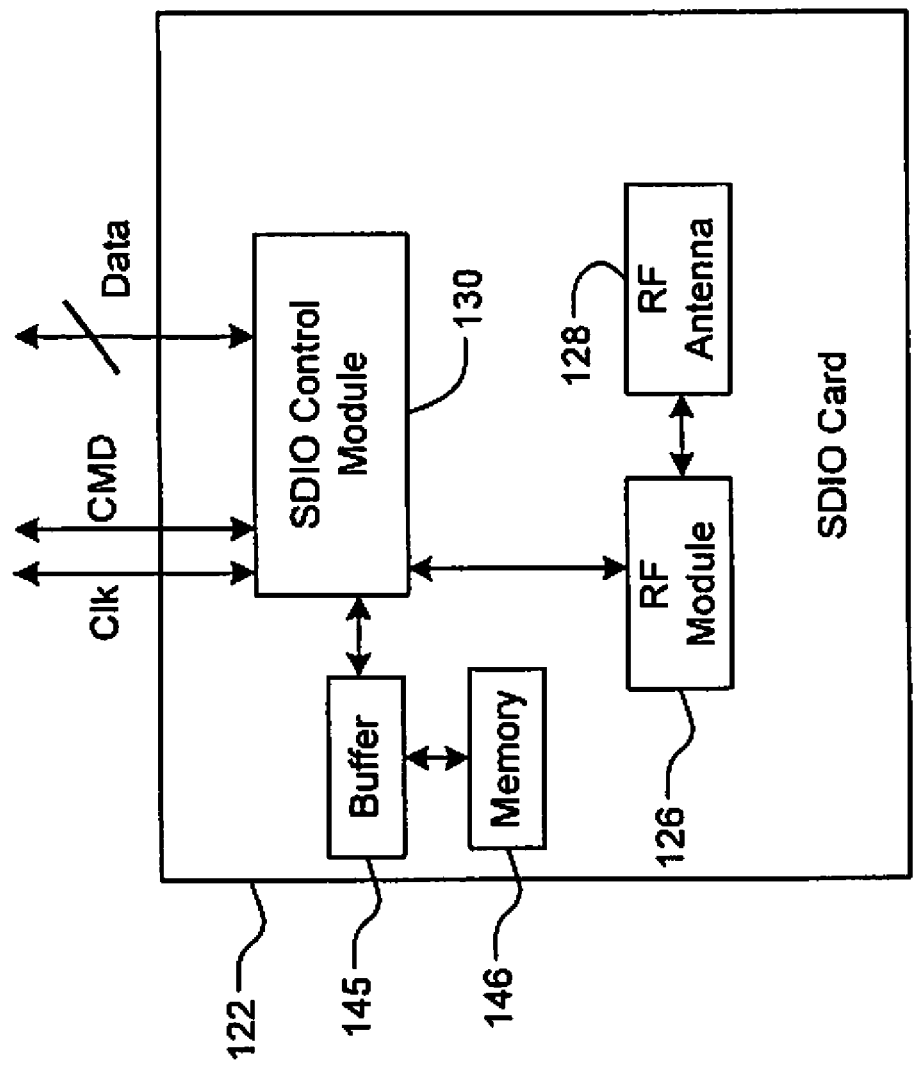
FIG. 1A is a functional block diagram of an interface system according to the present disclosure; a FIG. 1B is a functional block diagram of a peripheral device according to the present disclosure.

The following description is merely provided as an example of an embodiment and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the term memory may represent a distributed memory that includes one or more caches and/or buffers and may also include a plurality of registers.

The presently described embodiments include a direct memory access (DMA) control module that handles packet header communications of a data packet without interrupting a host control module, such as a central processing unit (CPU)). The DMA control module may handle I/O transactions faster than the CPU. The CPU therefore requests data from a peripheral card, such as a secure digital input/output (SDIO) card, and initiates DMA operations. The CPU may then enter a sleep state. The peripheral card transmits the packet. The DMA interacts with the peripheral card based on the packet header, and the DMA wakes up the CPU when the packet header communications are completed or if there is a problem with the DMA interactions. The CPU then may receive the data within the packet.

Referring now to FIGS. 1A and 1B, an interface system 119 allows a peripheral card 122 to communicate with an interface sub-system 120 of a host device 124. The card 122 may be a SD card, a SDIO card, a multimedia card (MMC) card, and/or any other known type of peripheral card or device. The card 122 may be referred to herein as a SDIO card for purposes of example and may include a radio frequency (RF) transceiver module 126 and RF antenna 128. The RF transceiver module 126 may be compatible with any of IEEE standards 802.11, 802.11a, 802.11b, 802.11g, 802.11h, 802.11n, 802.16, 802.20 and Bluetooth.

A host device may include a mobile device, such as a laptop computer, personal digital assistant (PDA), digital video device, cellular phone, or digital camera. A host device may also include any system capable of interfacing and otherwise communicating with peripheral cards, such as a hard disk drive (HDD), digital-versatile-disk (DVD), vehicle system, high definition television (HDTV), and the like.

The peripheral card 122 may include a control module 130 that allows peripherals, which may be added to or may communicate with the peripheral card 122, to comply with the SDIO standard. The card control module 130 may also control SD and SDIO applications within the host device 124.

The host device 124 may include a host control module 131 and a peripheral device control module 132 that may implement the SD standard. The peripheral device control module 132 may include first-in-first-out (FIFO) buffers 133-1, 133-2 that temporarily store incoming (RX) and outgoing (TX) packets and/or signals, respectively. The peripheral device control module 132 may also include an internal DMA control module 134 that effectively pumps incoming and outgoing data into or out of system memory 135 via the FIFO buffers 133-1, 133-2. The peripheral device control module 132 may also include registers 136 that may include response registers that temporarily store responses from the peripheral device 122 and command registers that temporarily store commands to be sent to the peripheral device 122.

As mentioned the peripheral device 122 may include an SDIO card. SDIO cards may use several standardized commands, which may be command signals/tokens issued by the host device 124, and responses, which may be response signals/tokens from the peripheral card 122 to respective commands. The commands may be SDIO values, such as CMD52 or CMD53 token values, and the responses may be R5 token values that are expected to be received in response to the CMD52, CMD53 commands. For example, CMD52 from the host control module 131 may be used to read data from the peripheral card 122. CMD53 from the host control module 131 may initiate read/write operations with the peripheral card 122. R5 from the peripheral card 122 may respond to any of the commands to indicate that the command was received and/or handled.

The host device 124 may also include a DMA control module 137 that communicates with the registers 136 and the host control module 131. The DMA control module 137 may include an address compare module 138 that compares the contents of different memory cells in system memory 135 to contents of the registers 136.

In operation, the control module 131 may prepare arrays 147, 148 of memory cells in system memory 135. A first array 147 may include a sequence of expected responses, such as R5 tokens. A second array 148 may include a sequence of commands to be executed, such as CMD52, CMD53 commands. The control module 131 points the DMA control module 137 to the beginning of the second array 148 and configures a logic circuit 144 such that the incoming interrupt from the peripheral device control module 132 may be serviced by the DMA control module 137. The control module 131 may point the DMA control module 137 through DMA descriptors that may represent addresses in the system memory 135.

When the peripheral device 122 has a data packet to be read by the host device 124, the peripheral device 122 triggers an interrupt 141. The DMA control module 137 services this interrupt by copying the first command in the second array 148 to the command registers 136 in the peripheral device control module 132. The peripheral device control module 132 sends that command to the peripheral device 122. The peripheral device 122 receives and processes that command and responds back with a response token. The response token may be sent back to the peripheral device control module 132 and placed in the FIFO buffers 133-1, 133-2 and in turn one of the registers 136.

The DMA control module 137 responds to the interrupt 141 by comparing the contents of the register 136 that includes the response token to the contents of the first memory cell in the first array 147. If the comparison succeeds (meaning the contents match), the DMA control module 137 copies the contents of the next memory cell in the second array 148 to the command registers 136 in the peripheral device control module 132. The aforementioned steps are repeated until all the commands stored in the second array 148 have been processed.

For reading data out of the peripheral device 122, the last command contains (as a parameter) the data length to be read. The host control module 131 may store the data length. The peripheral device 122 and the host device 124 may "agree" on a protocol which states that a packet will be read out of the peripheral device 122 in sections of pre-defined size. The peripheral device 122 may calculate the smallest integer number of data sections over which the data may be read out of the peripheral device 122. This integer number may be transferred by the peripheral device 122 where it is copied by the DMA control module 137 to a pre-defined memory address in the system memory 135. This memory address along with the contents of neighboring memory cells of the system memory may be used by the host control module 131 to construct the contents of the last command.

The peripheral device control module 132 may communicate with the peripheral card 122 via an interface control module 140. The communications may include clock, command (CMD), response (R), and data signals that may be generated by the peripheral device control module 132 and/or the peripheral card 122.

The peripheral device control module 132 may interrupt the host control module 131 to indicate that the host control module 131 should handle SD communications. An interrupt control module 142 may receive and process the interrupts and may wake-up the host control module 131.

The peripheral device control module 132 is in communication with the DMA control module 137 and with the interrupt control module 142 through, for example the logic circuit 144. The logic circuit 144 is operative to selectively pass interrupts from the peripheral device control module 132, the DMA control module 137 and/or the interrupt control module 142. The logic circuit 144 may include combinational logic gates 153, 155, that may include AND gates, NAND gates, OR gates, NOR gate, and the like. Alternatively, the logic circuit may be substituted with a processor that is configurable and controllable by the host control module 131.

The logic gates 153, 155 may receive the interrupt 141, although one of the logic gates 153, 155 may receive the interrupt 141 via an inverter 157. The logic gates 153, 155 may selectively pass the interrupt 141 to either the DMA control module 137 or the host control module 131 based on the comparison by the address compare module 138. The comparison from the address compare module 138 may be stored in a register 159.

The peripheral device control module 132 may use memory 135 to accommodate incoming responses and/or data from the peripheral card 122. The peripheral device control module 132 may communicate with other modules (not shown) within the host device 124. The peripheral card 122 may include a buffer 145 and/or memory 146 to store data and/or processes that may be used to implement SDIO functions.

Figure 2:
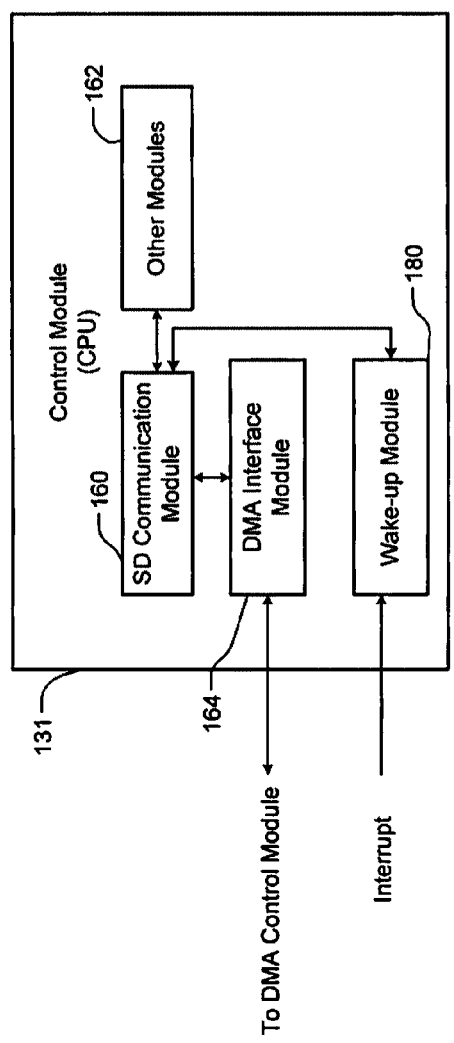
FIG. 2 is a functional block diagram of a host device control module according to the present disclosure.
Figure 3:
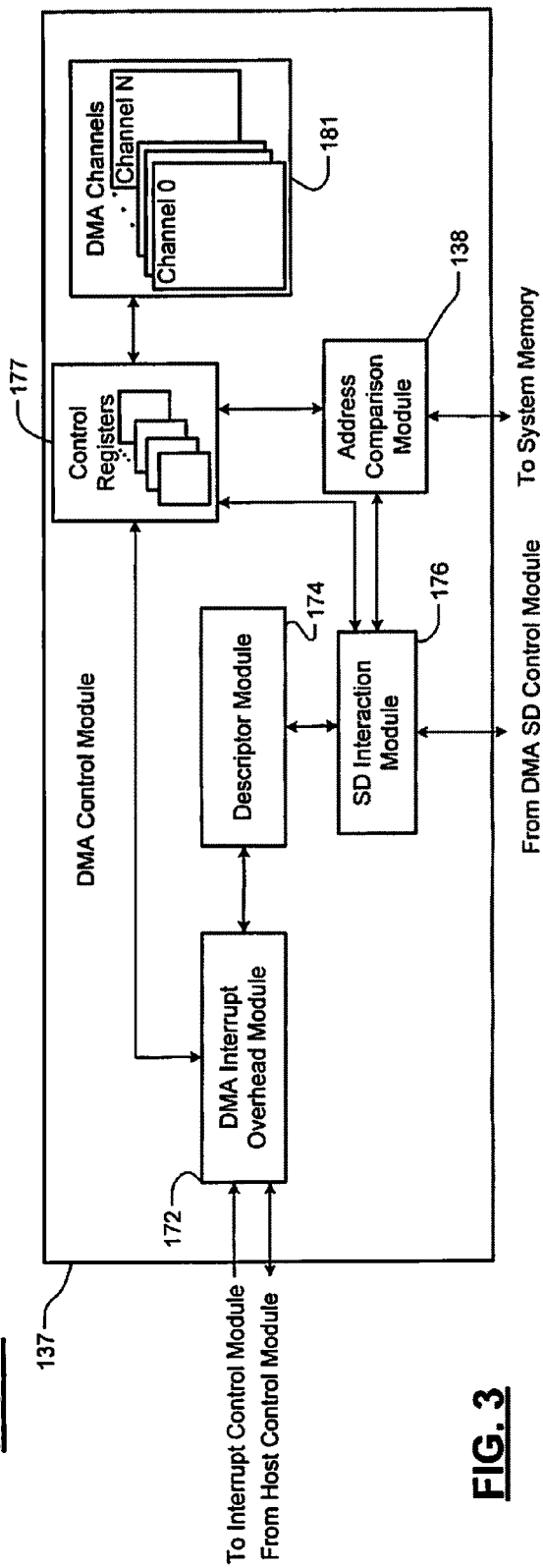
FIG. 3 is a functional block diagram of a DMA control module according to the present disclosure.

The host control module 131 may program the DMA control module 137 with a pointer to the memory location where the sequence of CMD52s and R5s reside. The DMA control module 137 runs the interrupt header sequence and notifies the host control module 131 when the sequence is complete. Referring now to FIGS. 2-3, the host control module 131 and the DMA control module 137 are illustrated. A communication module 160 that communicates with various other modules 162 of the host control module 131 may request SD information from the peripheral card 122. A DMA interface module 164 of the host control module 131 may initiate DMA processes so that the host control module 131 may sleep and/or dedicate processing to other systems. A DMA interrupt overhead module 172 of the DMA control module 137 may then handle interrupt header communications.

Previously, the host control module 131 set up a command and went into a sleep and/or wait mode. The host control module 131 would then wake-up in response to each response token based on an interrupt. Because the host control module 131 previously serviced these interrupts, host control module 131 latency and processing bandwidth were not optimal.

The host control module 131 may command the DMA control module 137 via descriptors, which may be DMA commands. For example, using descriptors, the host control module 131 may specify to the DMA control module 137 source and destination addresses for data, the size of data to be transferred and actions to performed on the data. Actions performed on data may include comparing the data to other data. Either the host control module 131 or the DMA control module 137 (as instructed by the host control module 131) prepares a chain of descriptors for the fixed overhead. The DMA control module 137 includes a SD interaction module 176 that allows the peripheral device control module 132 to copy blocks of data from one location to another without the need to interrupt the host control module 131 via the interrupt control module 142. Each descriptor may describe a single token stored in memory, for example, CMD52, CMD53, and R5. The DMA executes the sequence of tokens by sending commands to the peripheral card 122 through the peripheral device control module 132 and comparing received responses to the stored responses. The DMA control module 137 may include registers 177 that may store the descriptor sequence and/or the tokens to which the descriptors refer.

The DMA control module 137 may include channels 181 that may be configured by the host control module 131 to service any kind of data transfer and that may be controlled by registers 177. Each of the channels may be used to convey data from one or more internal or external devices. The channels 181 may be configured based on the depth of the FIFOs 133-1, 133-2 and bandwidth requirements for the host device 124. When multiple channels are actively executing, each channel is serviced with a burst of data. After each burst of data, the DMA control module 137 may perform a context switch to another active one of the channels 181. The DMA control module 137 may perform context switches based on whether a channel is active, whether the peripheral device 122 is currently requesting service, and the priority of the channel. A DMA descriptor may be a four-word (32-bits per word) block, aligned on a 16-byte boundary in system memory 135 that may be stored in the registers 177 and that may control the channels 181.

The descriptor module 174 may generate descriptors that represent or may be used to address command and/or response tokens. The DMA interface module 164 may also transmit descriptor information to the descriptor module 174. The descriptor information may indicate positions in the memory 135 where the command tokens and response tokens (or response verifications) are stored. Each of the descriptors may include a word, phrase, or alphanumerical term that may be stored in DMA related memory (for example the memory 135 or registers 177) and that may identify a command or response token. The descriptors may describe the content of data stored in the DMA related memory.

An SD interaction module 176 may transmit and receive command and response signals with the peripheral card 122. A wake-up module 180 of the host control module 131 may receive an interrupt from the DMA interrupt overhead module 172 when the DMA interrupt overhead module 172 is finished handling the interrupt header. The DMA control module 137 or the host control module 131 may mask the interrupt when the DMA control module 137 is handling interrupt headers.

Referring now to FIGS. 4-5, packets transferred over SDIO may contain a fixed overhead in the form of interrupt headers. To provide a frame of reference, packets 240 sent from the peripheral card 122 to the host device 124 may travel in a "receive" direction. Packets 242 sent from the host device 124 to the peripheral card 122 may travel in a "transmit" direction. Each data packet 240, 242 begins with or ends with an interrupt header 244, 246, respectively, that may be handled by the DMA control module 137. The peripheral card 122 interrupts the host device 124 for every packet the peripheral card 122 receives from a network. The interrupt header 244 informs the host device 124 of the reason for the interrupt. The interrupt header 246 informs the host device 124 that the peripheral card 122 received the data correctly and that new data may now be sent.

Receive packets 240 also include a packet descriptor 248 that may indicate packet length and packet type. The packet descriptor 248 may be followed by SDIO read commands 250 that are followed by payload data 252. Transmit packets 242 may begin with an SDIO write command 254 followed by payload data 256.

Figure 6:
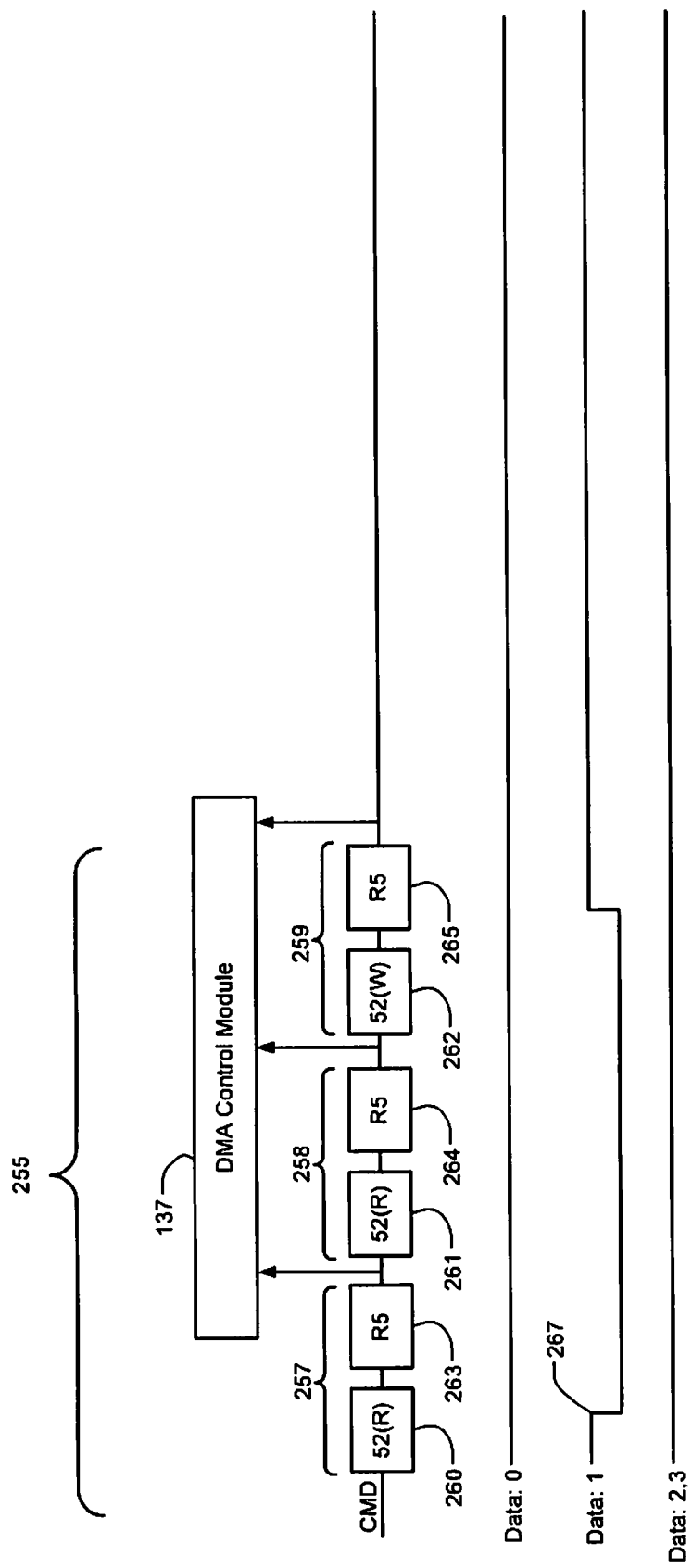
FIG. 6 is a timing diagram of interrupt header communications.

Referring now to FIG. 6, examples of communications 255 between the host device 124 and the peripheral card 122 are illustrated. The communications 255 may be made through a command line (CMD) and multiple data lines (Data [3:0]). The interrupt headers 244, 246 cause fixed interrupt communications 255 that may travel through the command line. The interrupt headers 244, 246 may include a sequence of standard CMD52 command tokens 260-262.

The peripheral card 122 may respond to the commands with standard R5 response tokens 263-265. The commands 260-262 and corresponding responses 263-265 may each be referred to as a command response set 257-259. Each of the response tokens 263-265 from the peripheral card 122 may cause an interrupt to be sent to the host control module 131 so that the host control module 131 may handle the next command. However, the DMA control module 137 may instead handle the interrupts.

In the receive direction, the interrupt header 244 informs the DMA control module 137 (based on CMD52s 260-262 and respective R5 responses) that the primary function of the peripheral card 122 has interrupted the host device 124. This interrupt may indicate that an event 267 has occurred. Typically, the primary function is the only function of the card. An event may include the peripheral card 122 receiving a network packet that is intended for the host device 124. Another event may include a response sent from the peripheral card 122 to the host device 124 that indicates the peripheral card 122 has successfully received/transmitted the previous packet and is now ready to receive the next packet.

Figure 7:
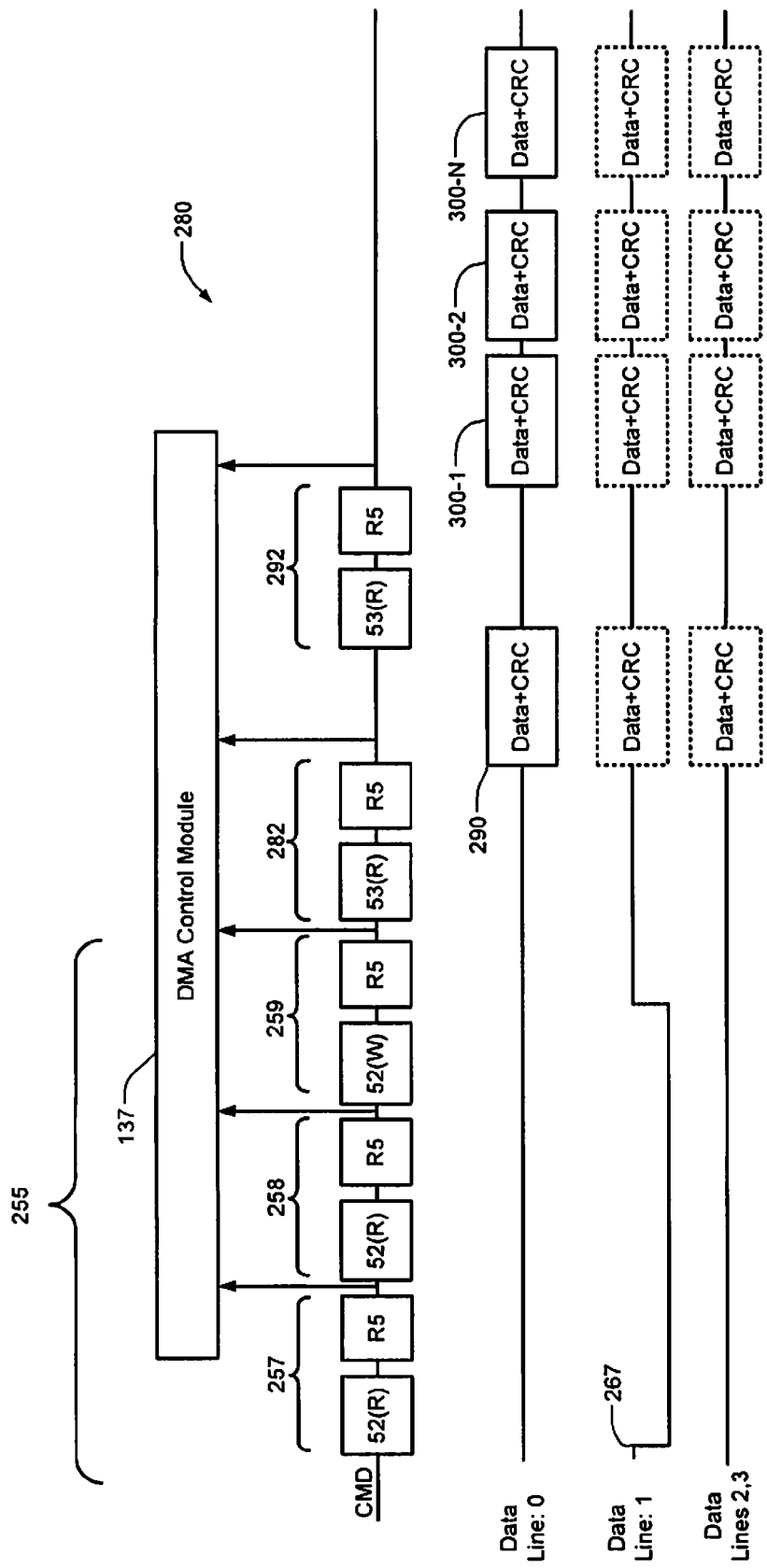
FIG. 7 is a timing diagram of receive path communications.

Referring now to FIG. 7, an example of a receive direction communication 280 is illustrated. Packet descriptor communications 282 follow interrupt communications 255 in the command line. The DMA control module 137 reads packet descriptor data 290 from the peripheral card 122 in one of the data lines. All data communications may include cyclical redundancy checks (CRCs) to detect transmission errors. The SDIO read command 250 initiates SDIO read communications 292, and data 300-1, 300-2, . . . , and 300-N are transmitted to the host device 124 in data line 0. Data lines 1-3 may be used for higher data transfer rates. Further, any of the data lines 0-3 may be used to indicate an event 267.

Figure 8:
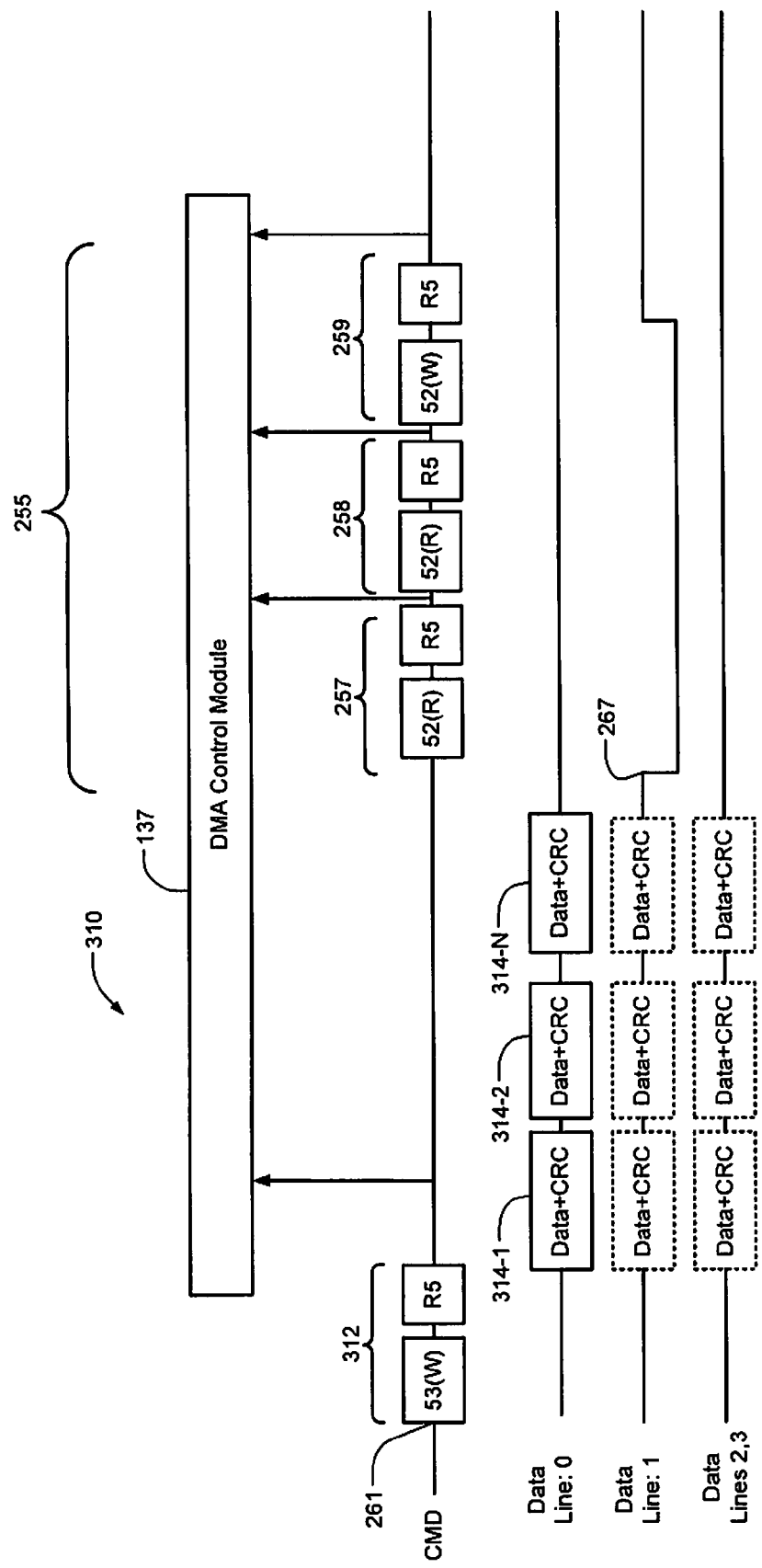
FIG. 8 is a timing diagram of transmit path communications.

Referring now to FIG. 8, an example of a transmit direction communication 310 is illustrated. The SDIO write command 261 initiates SDIO write communications 312, and data 314-1, 314-2, . . . , and 314-N are transmitted to the peripheral card 122 in data line 0. Data lines 1-3 may be used for higher data transfer rates. Further, any of data lines 0-3 may be used to indicate a transmission complete event 267. The header 246 follows the data 314-1, 314-2, . . . , and 314-N.

Figure 9:
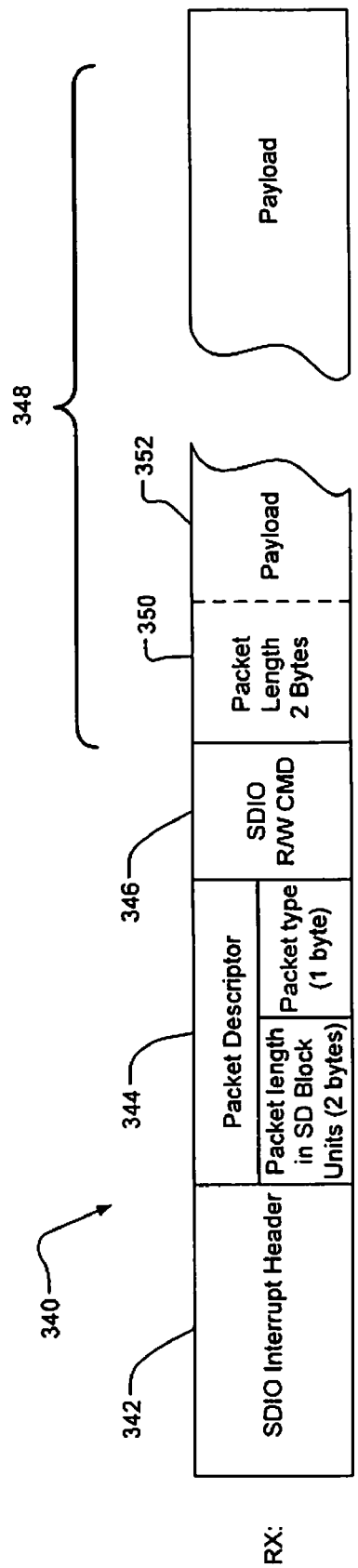
FIG. 9 is a block diagram of a modified receive path packet according to the present disclosure.

Referring now to FIG. 9, a modified packet 340 is illustrated in accordance with an embodiment of the present disclosure. The packet includes an interrupt header 342, a packet descriptor 344, a SDIO read/write command 346, and a payload 348 that includes packet length data 350 and payload data 352. The command-response sequence that precedes the actual data exchange (read or write) between the host device and the peripheral device may be fixed and thus may be predicted in advance. The fixed length may be used to define the packet length data 350.

The host control module 131 may not "know" in advance what size of packet is about to read from the device, as the packet length may vary from packet to packet. Therefore, after the first CMD53 has been issued and responded properly, the peripheral card 122 may interrupt the host control module 131 to interpret the packet header that has been read out of the peripheral card 122. The host control module 131 may then calculate an integer number of blocks that can contain the packet and may issue a CMD53 with that number of blocks.

In order to avoid waking up the host control module 131, the peripheral card 122 may calculate the integer number of memory blocks that can contain the packet payload length plus a length of a header. The header may be a number of bits added to the payload 348 of a packet that includes the respective length data. The DMA control module 137 and/or the host control module 131 may therefore read the length data from the packet and anticipate when interrupt header operations may be needed.

Figure 10:
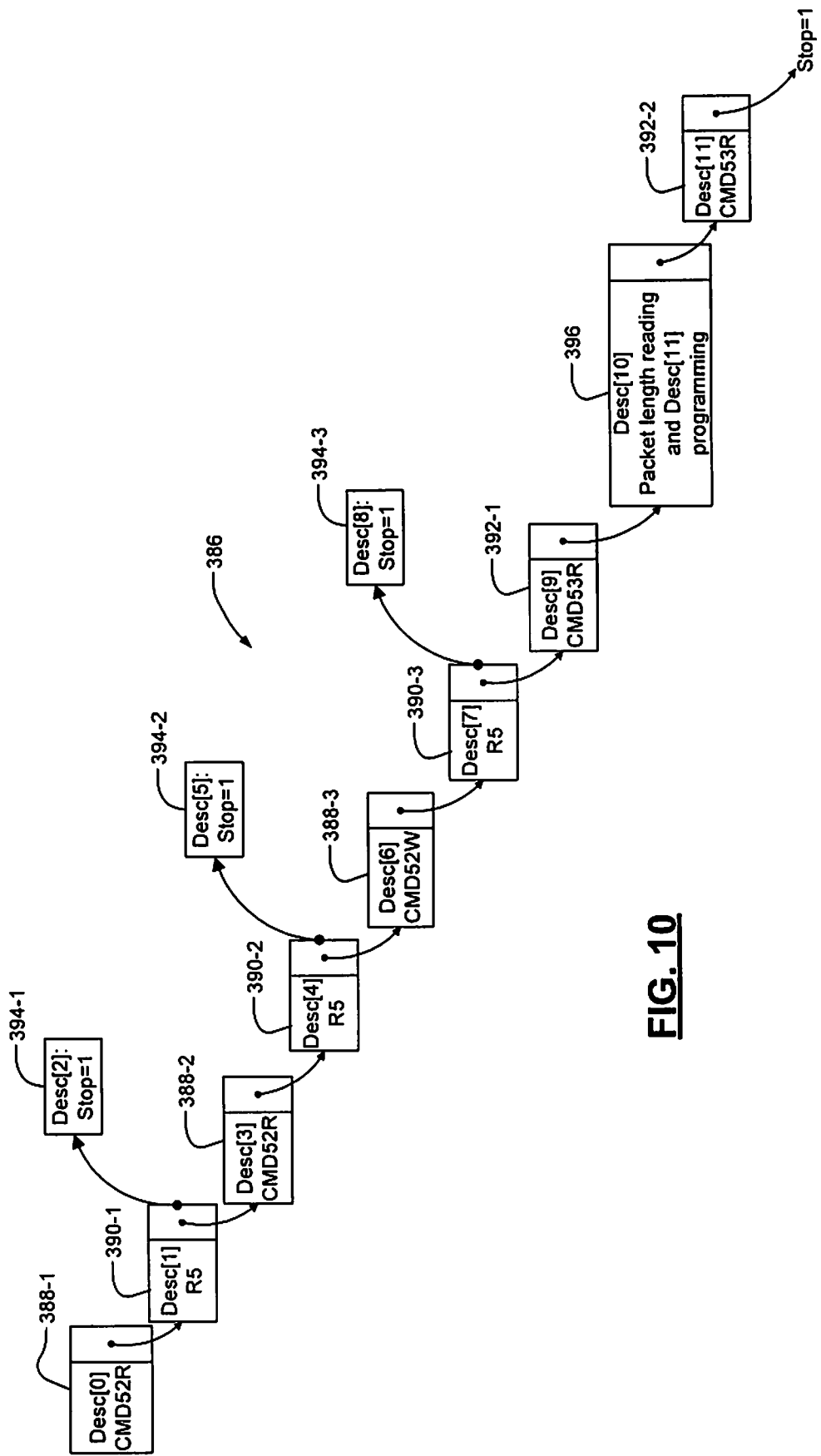
FIG. 10 is a block diagram of descriptors according to the present disclosure.

Referring now to FIG. 10, a functional block diagram 386 illustrates the descriptors and links between them. The host control module 131 may direct the DMA descriptor module 174 to descriptors. The descriptors may include three CMD52 descriptors 388-1, 388-2, 388-3 of 12 bytes each, three R5 descriptors 390-1, 390-2, 390-3 for comparison with received R5 responses, two CMD53 descriptors 392-1, 392-2 of 12 bytes each, three dummy descriptors 394-1, 394-2, 394-3, and a packet length reading descriptor 396. The dummy descriptors may halt DMA control module operations and re-activate the host control module 131.

Figure 11:
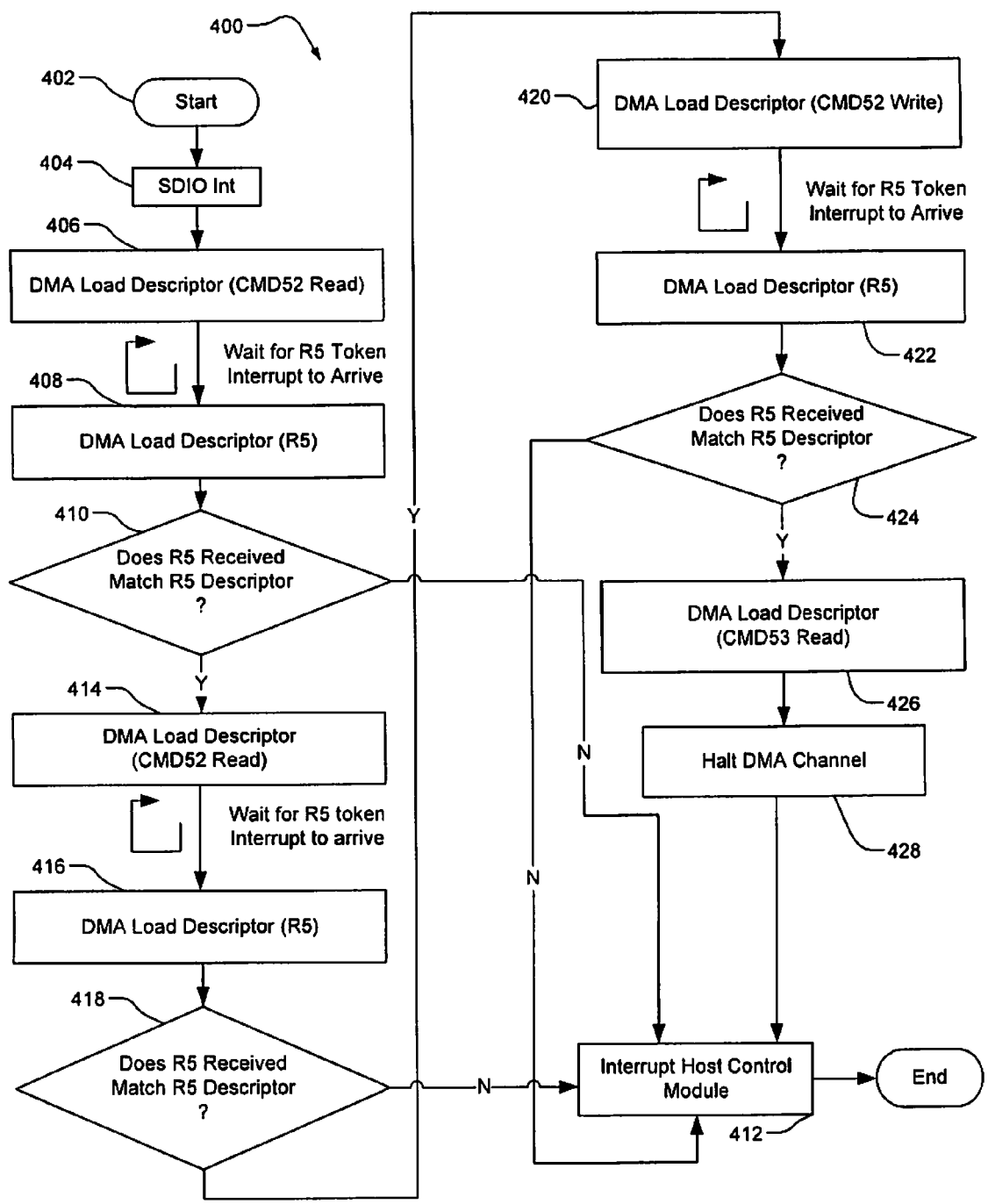
FIG. 11 is a block diagram of a method for operating an interface system according to the present disclosure.

Referring now to FIG. 11, a flow diagram 400 of a method for interfacing between two devices is illustrated. Control starts in step 402 after the host control module 131 implements the descriptor sequence in the DMA control module 137. In step 404, the peripheral device, which may, for example, include an SDIO card sends an interrupt to the host device 124. In step 406, the DMA control module 137 responds to the interrupt and loads the descriptor that includes commands, such as CMD52, that correspond to an instruction to check a register of the peripheral card 122 that includes the pending interrupt. The DMA control module 137 waits for the R5 token to arrive from the peripheral card 122. The DMA control module 137 may wait for a predefined time. The peripheral card 122 and/or the peripheral device control module 132 may generate an interrupt based on the R5 token.

In step 408, the DMA control module 137 loads the response (R5) descriptor. In step 410, if the DMA control module 137 determines that the response token does not match the descriptor value of the response token, then the DMA control module 137 interrupts the host control module 131 in step 412. If true, the DMA control module 137 loads the next DMA descriptor (CMD52 descriptor for function 1 of the peripheral card 122), otherwise, the DMA control module 137 interrupts the host control module 131 in step 412.

When step 410 is true, the DMA control module 137 loads the descriptor for CMD52 read function 1 that indicates whether the peripheral card has a packet to upload to the host device 124 in step 414. In other words, CMD52 read function 1 correspond to the DMA control module 137 checking a register of the peripheral card 122. In step 416, the DMA control module 137 loads the descriptor for the R5 token (that is a response to step 414) after the R5 token arrives.

In step 418, if the DMA control module 137 determines that the descriptor value of the response token is incorrect or not what was expected, then the DMA control module 137 interrupts the host control module 131 in step 412. In other words, if the R5 token does not correspond to a receive packet interrupt, the DMA control module 137 interrupts the host control module 131.

Otherwise, in step 420, the DMA control module 137 loads the descriptor CMD52 write function 1 to clear an interrupt status register of the peripheral card 122 and/or the peripheral device control module 132. The DMA control module 137 loads the R5 descriptor in step 422 when the DMA control module 137 receives the R5 response token that verifies that the interrupt clear is complete. In step 424, if the R5 token does not correspond to the descriptor for the R5 token, the DMA control module 137 interrupts the host control module 131 in step 412. Otherwise, the DMA control module 137 loads the CMD53 descriptor to read the packet header in step 426. In step 428, DMA operations are complete; and the DMA control module 137 interrupts the host control module 131 in step 412. The host control module 131 may then process the payload data of the packet.

The method of FIG. 11 may also be represented in pseudo-code as follows:

```
//Data transferring descriptor
desc[0].ddadr = &desc[1];
desc[0].dsadr = CMD52_BUF;
desc[0].dtadr = MMC_CMD;
desc[0].dcmd = Len=12 bytes;
// Compare and Branch Descriptor modes enabled.
// No data transferred by this descriptor.
// Source is indirectly addressed and target is directly addressed
// On a successful compare of & MMC_RES with &R5_BUF,
// Descriptor chain branches to desc[1] + 4*32bits, i.e desc[3].
// If Compare fails, then descriptor chain jumps to desc[2].
// Desc[2] stops the channel as R5 received was not as expected.
desc[1].ddadr = &desc[2], BrEn = 1;
desc[1].dsadr = MMC_RES;
```

-continued

```
desc[1].dtadr = 0x1002;
desc[1].dcmd = CmpEn=1, AddrMode = b01;
//Error setting descriptor, which stops the channel as
// &MMC_RES != &R5_BUF
//No data transferred. Stop interrupt triggered.
desc[2].ddadr = (Stop = 1);
desc[2].dsadr = ignored;
desc[2].dtadr = ignored;
desc[2].dcmd = Len=0;
//Data transferring descriptor
desc[3].ddadr = &desc[4];
desc[3].dsadr = CMD52_BUF + 0Xc (12 bytes);
desc[3].dtadr = MMC_CMD;
desc[3].dcmd = Len=12 bytes;
// Compare and Branch Descriptor modes enabled.
// No data transferred by this descriptor.
// Source is indirectly addressed and target is directly addressed
// On a successful compare of & MMC_RES with &R5_BUF,
// Descriptor chain branches to desc[4] + 4*32bits, i.e desc[6].
// If Compare fails, then descriptor chain jumps to desc[5].
// Desc[5] stops the channel as R5 received was not as expected.
desc[4].ddadr = &desc[5], BrEn = 1;
desc[4].dsadr = MMC_RES;
desc[4].dtadr = 0x1002;
desc[4].dcmd = CmpEn=1, AddrMode = b01;
//Error setting descriptor, which stops the channel as
// &MMC_RES != &R5_BUF
//No data transferred. Stop interrupt triggered.
desc[5].ddadr = (Stop = 1);
desc[5].dsadr = ignored;
desc[5].dtadr = ignored;
desc[5].dcmd = Len = 0;
desc[6].ddadr = (Stop = 1);
desc[6].dsadr = CMD52_BUF + 0x18 (24 bytes);
desc[6].dtadr = MMC_CMD;
desc[6].dcmd = Len=12 bytes;
```

Figure 12:
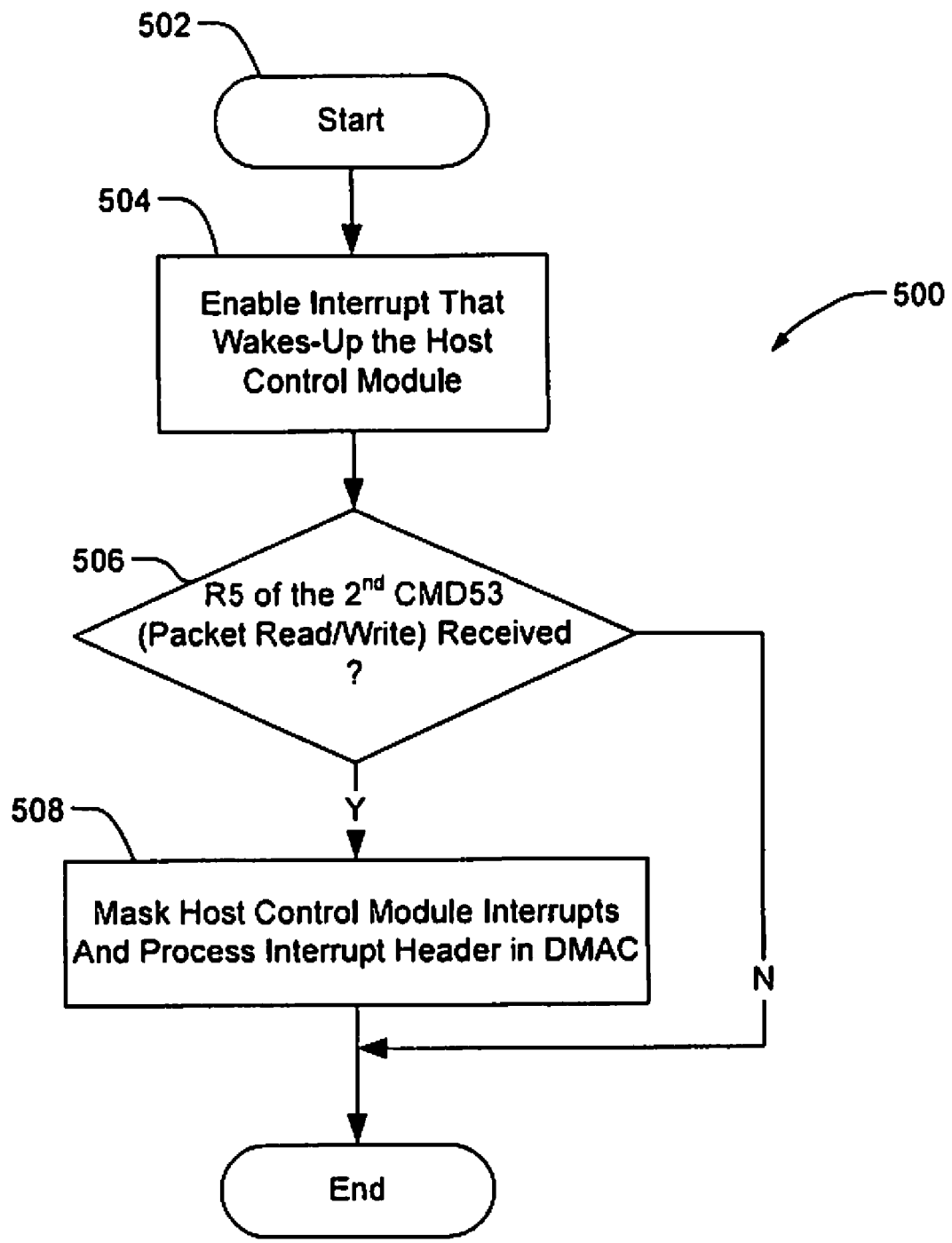
FIG. 12 is a block diagram of another method for operating an interface system according to the present disclosure.

Referring now to FIG. 12, a method 500 for activating interrupt header processing of the DMA control module 137 is illustrated. Control starts in step 502. In step 504, the host control module 131 and/or the DMA control module 137 enables an interrupt that will wake-up the host control module when interrupt header handling is complete. In step 506, the host control module 131 may initiate a packet transfer; or the DMA control module 137 may receive a response token that indicates that an interrupt header needs to be processed. The response token of step 506 may correspond to an R5 token includes a response to reception of a second CMD53 token. The DMA control module 137 and/or the host control module 131 may then mask Interrupts to the host control module 131 in step 508 until the interrupt header is processed.

Referring now to FIGS. 13A-13F, various examples of implementations incorporating the teachings of the present disclosure are shown.

Figure 13A:
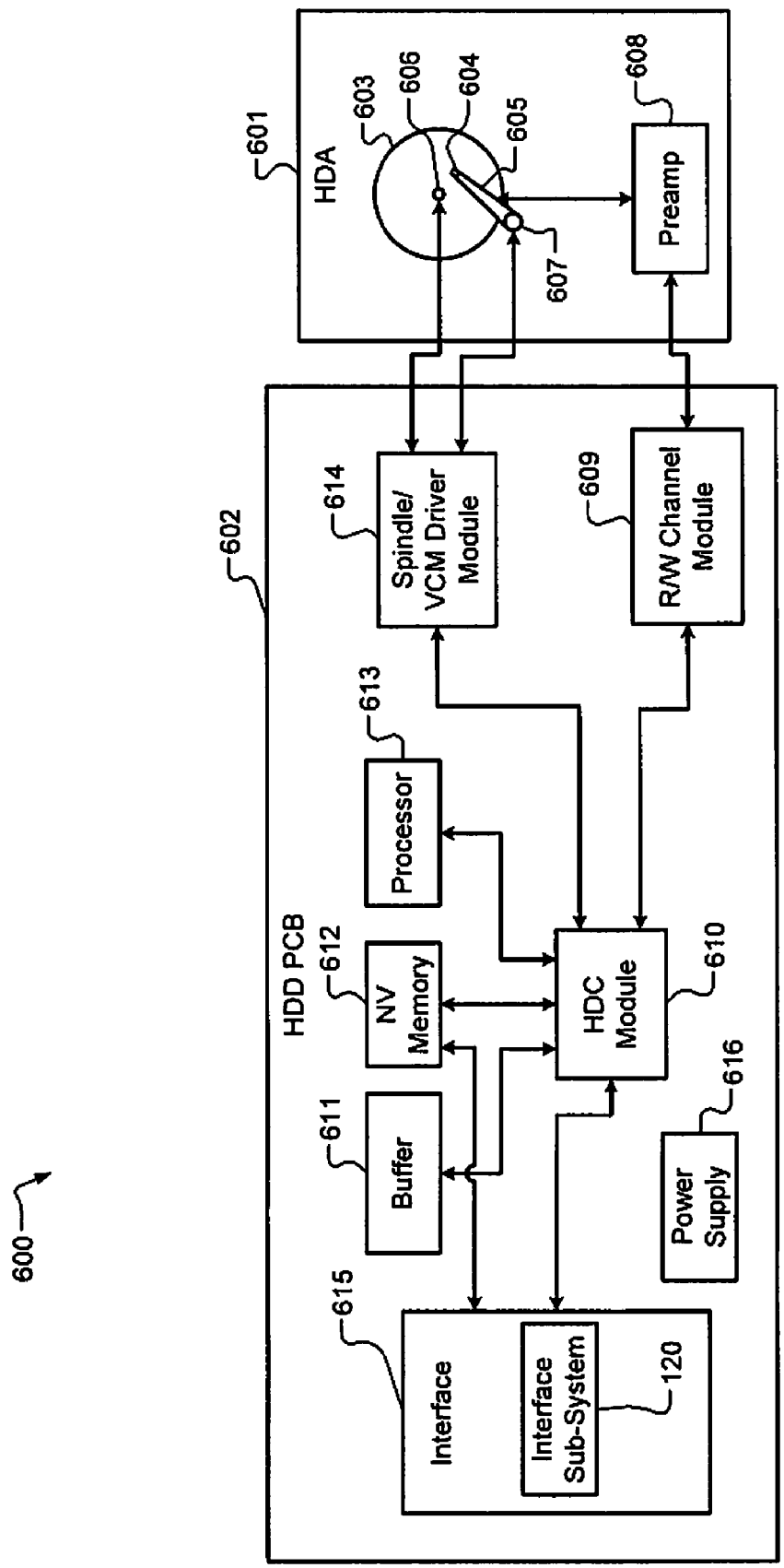
FIG. 13A is a functional block diagram of a hard disk drive.

Referring now to FIG. 13A, an I/O interface of a hard disk drive (HDD) 600 may include an interface sub-system 120 for communications with peripheral cards. The HDD 600 includes a hard disk assembly (HDA) 601 and an HDD printed circuit board (PCB) 602. The HDA 601 may include a magnetic medium 603, such as one or more platters that store data, and a read/write device 604. The read/write device 604 may be arranged on an actuator arm 605 and may read and write data on the magnetic medium 603. Additionally, the HDA 601 includes a spindle motor 606 that rotates the magnetic medium 603 and a voice-coil motor (VCM) 607 that actuates the actuator arm 605. A preamplifier device 608 amplifies signals generated by the read/write device 604 during read operations and provides signals to the read/write device 604 during write operations.

The HDD PCB 602 includes a read/write channel module (hereinafter, "read channel") 609, a hard disk control module (HDC) module 610, a buffer 611, nonvolatile memory 612, a processor 613, and a spindle/VCM driver module 614. The read channel 609 processes data received from and transmitted to the preamplifier device 608. The HDC module 610 controls components of the HDA 601 and communicates with an external device (not shown) via the I/O interface 615. The external device may include a computer, a multimedia device, a mobile computing device, etc. The I/O interface 615 may include wireline and/or wireless communication links.

The HDC module 610 may receive data from the HDA 601, the read channel 609, the buffer 611, nonvolatile memory 612, the processor 613, the spindle/VCM driver module 614, and/or the I/O interface 615. The processor 613 may process the data, including encoding, decoding, filtering, and/or formatting. The processed data may be output to the HDA 601, the read channel 609, the buffer 611, nonvolatile memory 612, the processor 613, the spindle/VCM driver module 614, and/or the I/O interface 615.

The HDC module 610 may use the buffer 611 and/or nonvolatile memory 612 to store data related to the control and operation of the HDD 600. The buffer 611 may include DRAM, SDRAM, etc. Nonvolatile memory 612 may include any suitable type of semiconductor or solid-state memory, such as flash memory (including NAND and NOR flash memory), phase change memory, magnetic RAM, and multi-state memory, in which each memory cell has more than two states. The spindle/VCM driver module 614 controls the spindle motor 606 and the VCM 607. The HDD PCB 602 includes a power supply 616 that provides power to the components of the HDD 600.

Figure 13B:
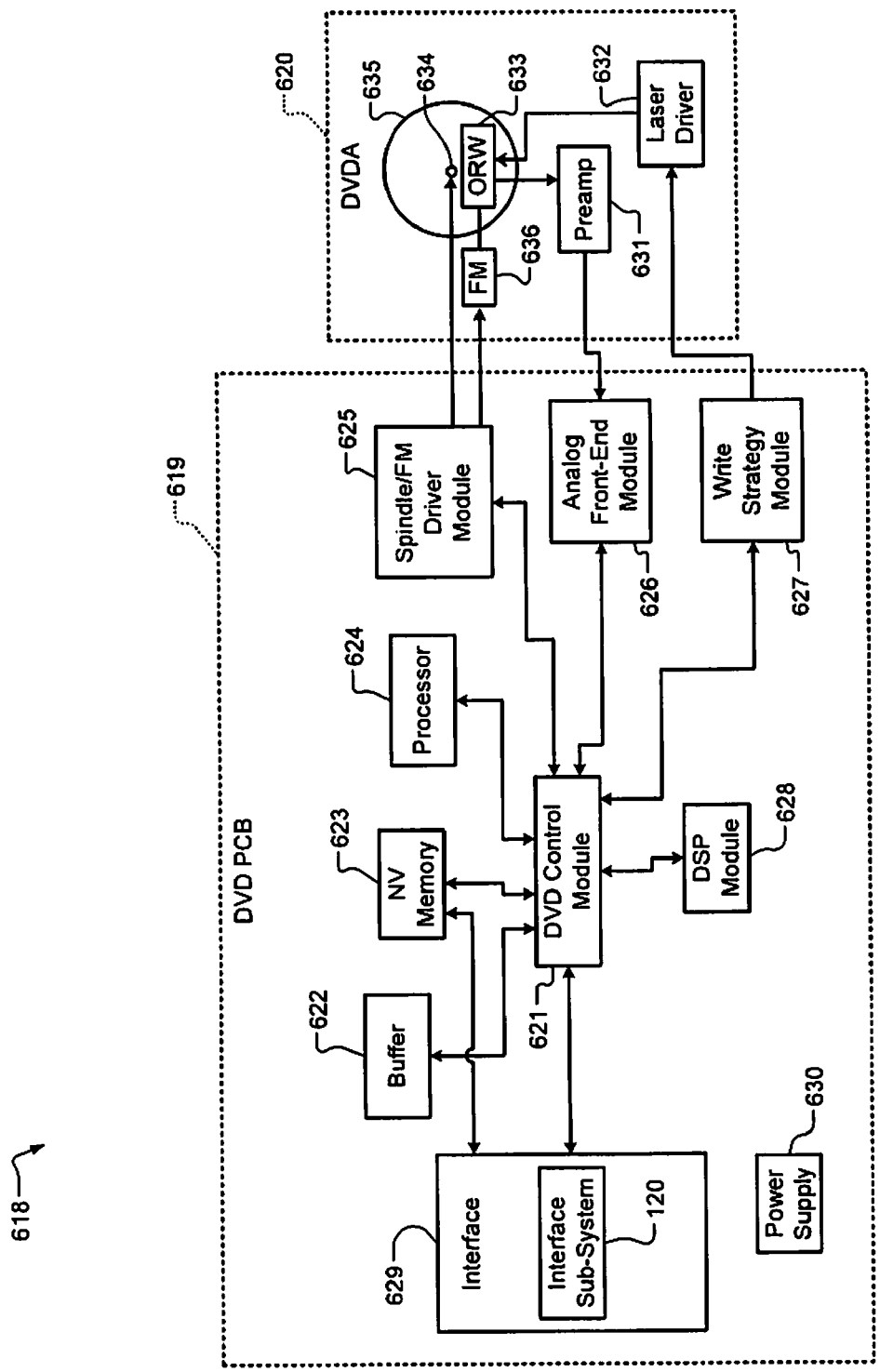
FIG. 13B is a functional block diagram of a DVD drive.

Referring now to FIG. 13B, an I/O interface of a DVD drive 618 or of a CD drive (not shown) may include an interface sub-system 120 to communicate with peripheral cards. The DVD drive 618 includes a DVD PCB 619 and a DVD assembly (DVDA) 620. The DVD PCB 619 includes a DVD control module 621, a buffer 622, nonvolatile memory 623, a processor 624, a spindle/FM (feed motor) driver module 625, an analog front-end module 626, a write strategy module 627, and a DSP module 628.

The DVD control module 621 controls components of the DVDA 620 and communicates with an external device (not shown) via the I/O interface 629. The external device may include a computer, a multimedia device, a mobile computing device, etc. The I/O interface 629 may include wireline and/or wireless communication links.

The DVD control module 621 may receive data from the buffer 622, nonvolatile memory 623, the processor 624, the spindle/FM driver module 625, the analog front-end module 626, the write strategy module 627, the DSP module 628, and/or the I/O interface 629. The processor 624 may process the data, including encoding, decoding, filtering, and/or formatting. The DSP module 628 performs signal processing, such as video and/or audio coding/decoding. The processed data may be output to the buffer 622, nonvolatile memory 623, the processor 624, the spindle/FM driver module 625, the analog front-end module 626, the write strategy module 627, the DSP module 628, and/or the I/O interface 629.

The DVD control module 621 may use the buffer 622 and/or nonvolatile memory 623 to store data related to the control and operation of the DVD drive 618. The buffer 622 may include DRAM, SDRAM, etc. Nonvolatile memory 623 may include any suitable type of semiconductor or solid-state memory, such as flash memory (including NAND and NOR flash memory), phase change memory, magnetic RAM, and multi-state memory, in which each memory cell has more than two states. The DVD PCB 619 includes a power supply 630 that provides power to the components of the DVD drive 618.

The DVDA 620 may include a preamplifier device 631, a laser driver 632, and an optical device 633, which may be an optical read/write (ORW) device or an optical read-only (OR) device. A spindle motor 634 rotates an optical storage medium 635, and a feed motor 636 actuates the optical device 633 relative to the optical storage medium 635.

When reading data from the optical storage medium 635, the laser driver provides a read power to the optical device 633. The optical device 633 detects data from the optical storage medium 635, and transmits the data to the preamplifier device 631. The analog front-end module 626 receives data from the preamplifier device 631 and performs such functions as filtering and A/D conversion. To write to the optical storage medium 635, the write strategy module 627 transmits power level and timing data to the laser driver 632. The laser driver 632 controls the optical device 633 to write data to the optical storage medium 635.

Figure 13D:
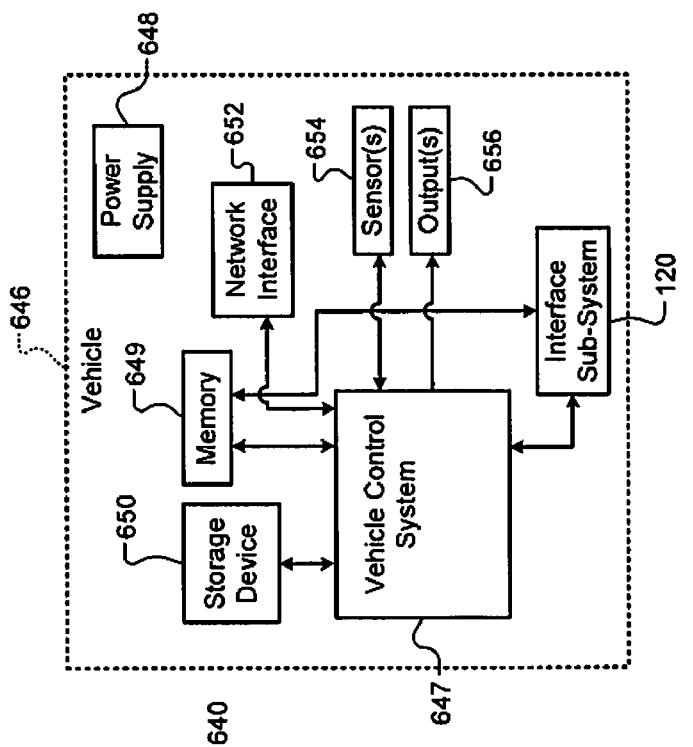
FIG. 13D is a functional block diagram of a vehicle control system.
Figure 13C:
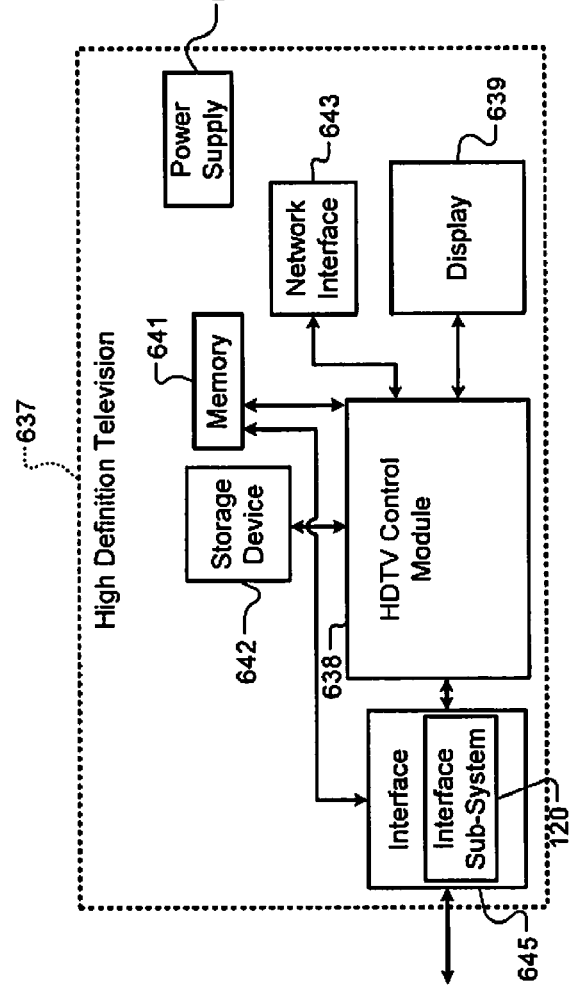
FIG. 13C is a functional block diagram of a high definition television.

Referring now to FIG. 13C, an external interface of a high definition television (HDTV) 637 may include an interface sub-system 120. Peripheral cards may communicate with a HDTV control module via the interface sub-system 120. The HDTV 637 includes the HDTV control module 638, a display 639, a power supply 640, memory 641, a storage device 642, a network interface 643, and the external interface 645. If the network interface 643 includes a wireless local area network interface, an antenna (not shown) may be included.

The HDTV 637 can receive input signals from the network interface 643 and/or the external interface 645, which can send and receive data via cable, broadband Internet, and/or satellite. The HDTV control module 638 may process the input signals, including encoding, decoding, filtering, and/or formatting, and generate output signals. The output signals may be communicated to one or more of the display 639, memory 641, the storage device 642, the network interface 643, and the external interface 645.

Memory 641 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 642 may include an optical storage drive, such as a DVD drive, and/or a hard disk drive (HDD). The HDTV control module 638 communicates externally via the network interface 643 and/or the external interface 645. The power supply 640 provides power to the components of the HDTV 637.

Referring now to FIG. 13D, a vehicle 646 may include an interface system to allow a vehicle control system to communicate with peripheral cards. The vehicle 646 may include a vehicle control system 647, a power supply 648, memory 649, a storage device 650, and a network interface 652. If the network interface 652 includes a wireless local area network interface, an antenna (not shown) may be included. The vehicle control system 647 may be a powertrain control system, a body control system, an entertainment control system, an anti-lock braking system (ABS), a navigation system, a telematics system, a lane departure system, an adaptive cruise control system, etc.

The vehicle control system 647 may communicate with one or more sensors 654 and generate one or more output signals 656. The sensors 654 may include temperature sensors, acceleration sensors, pressure sensors, rotational sensors, airflow sensors, etc. The output signals 656 may control engine operating parameters, transmission operating parameters, suspension parameters, etc.

The power supply 648 provides power to the components of the vehicle 646. The vehicle control system 647 may store data in memory 649 and/or the storage device 650. Memory 649 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 650 may include an optical storage drive, such as a DVD drive, and/or a hard disk drive (HDD). The vehicle control system 647 may communicate externally using the network interface 652.

Referring now to FIG. 13E, a cellular phone 658 may include an interface sub-system 120 that communicates with peripheral cards. The cellular phone 658 includes a phone control module 660, a power supply 662, memory 664, a storage device 666, and a cellular network interface 667. The cellular phone 658 may include a network interface 668, a microphone 670, an audio output 672 such as a speaker and/or output jack, a display 674, and a user input device 676 such as a keypad and/or pointing device. If the network interface 668 includes a wireless local area network interface, an antenna (not shown) may be included.

The phone control module 660 may receive input signals from the cellular network interface 667, the network interface 668, the microphone 670, and/or the user input device 676. The phone control module 660 may process signals, including encoding, decoding, filtering, and/or formatting, and generate output signals. The output signals may be communicated to one or more of memory 664, the storage device 666, the cellular network interface 667, the network interface 668, and the audio output 672.

Memory 664 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 666 may include an optical storage drive, such as a DVD drive, and/or a hard disk drive (HDD). The power supply 662 provides power to the components of the cellular phone 658.

Referring now to FIG. 13F, an interface of a mobile device 689 may include an interface sub-system 120 that communicates with peripheral cards. The mobile device 689 may include a mobile device control module 690, a power supply 691, memory 692, a storage device 693, a network interface 694, and the external interface 699. If the network interface 694 includes a wireless local area network interface, an antenna (not shown) may be included.

The mobile device control module 690 may receive input signals from the network interface 694 and/or the external interface 699. The external interface 699 may include USB, infrared, and/or Ethernet. The input signals may include compressed audio and/or video, and may be compliant with the MP3 format. Additionally, the mobile device control module 690 may receive input from a user input 696 such as a keypad, touchpad, or individual buttons. The mobile device control module 690 may process input signals, including encoding, decoding, filtering, and/or formatting, and generate output signals.

The mobile device control module 690 may output audio signals to an audio output 697 and video signals to a display 698. The audio output 697 may include a speaker and/or an output jack. The display 698 may present a graphical user interface, which may include menus, icons, etc. The power supply 691 provides power to the components of the mobile device 689. Memory 692 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 693 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A host device, comprising:
a peripheral control module that includes
a first memory register that receives first data from a first memory; and
a direct memory access (DMA) module that communicates with the first memory;
a host control module that receives second data from the first memory;
a DMA control module that communicates with the first memory register, the host control module and a second memory that includes a first memory array, and
wherein the DMA control module
compares contents of the first memory array to contents of the first memory register,
controls transfers of the first data from the first memory to the peripheral control module based on the comparison made by the DMA control module, and
processes a secure digital input/output header to run an interrupt header sequence without interrupting the host control module until the interrupt header sequence is complete; and
an interrupt control module
that communicates with the DMA control module, and
that selectively passes interrupts to the host control module when the contents of the first memory do not match contents of the first register.

2. The host device of claim 1,
wherein the DMA control module controls the transfers of the first data without interruption of the host control module, and
wherein the first data includes packet overhead data and the second data includes packet payload data.

3. The host device of claim 1, wherein the DMA control module transfers the first data from the first memory to the peripheral control module when the contents of the first memory array match the contents of the first memory register.

4. The host device of claim 1, wherein the host control module controls transfers of the second data in response to the interrupts.

5. The host device of claim 1, further comprising a logic circuit including a plurality of logic gates,
wherein the peripheral control module communicates with the DMA control module and the interrupt control module through the logic circuit,
wherein the logic circuit selectively passes the interrupts from one of the peripheral control module, the DMA control module and the interrupt control module, and
wherein the logic circuit
passes the interrupts when the contents of the first memory array do not match the contents of the first memory register, and
does not pass the interrupts when the contents of the first memory array match the contents of the first memory register.

6. The host device of claim 1, wherein the peripheral control module comprises a secure digital input/output (SDIO) control module.

7. The host device of claim 1, wherein the host control module
defines a source memory address in the first memory,
a destination memory address in the second memory, and
a size of the first and second data to be transferred.

8. An interface system comprising:
the host device of claim 1; and
a peripheral device that is controlled by the peripheral control module,
wherein the peripheral device comprises the first memory,
wherein the transfers of the first data comprises a transfer of a block of data from the first memory to the first memory register, and
wherein the peripheral device is located remotely from the host device.

9. The interface system of claim 8, wherein the peripheral device communicates with the host device via a secure digital input/output (SDIO).

10. The interface system of claim 8, wherein the host control module prepares the first memory array and a second memory array in the second memory, and wherein the host control module directs the DMA control module to communicate with the first and second memory arrays.

11. The interface system of claim 10, wherein
the first memory array includes a sequence of expected responses from the peripheral device, and
the second memory array includes a sequence of commands to be executed by the peripheral device.

12. The interface system of claim 10, wherein when the peripheral device includes a data packet to be read by the host device, the peripheral device triggers an interrupt, and wherein the DMA control module services the interrupt by copying a first command in the second memory array to a second register in the peripheral control module.

13. The interface system of claim 12, wherein the peripheral device receives the first command, and responds to the first command with a response token.

14. The interface system of claim 13,
wherein the peripheral device sends the response token to the first memory register, and
wherein the peripheral control module triggers an interrupt in response to the response token that is serviced by the DMA control module.

15. The host device of claim 11,
wherein packets include the first and second data, and wherein the peripheral control module receives the packets in chunks of predetermined size,
wherein the peripheral device determines a length of the packets based on a number of data chunks over which the packets are to be read out of the peripheral device, and wherein a last one of the sequence of commands at least partially refers to the length.

16. An interface system comprising:
the host device of claim 15, and
the peripheral device.

17. The interface system of claim 16, wherein the peripheral device comprises at least one of a secure digital (SD) card, a SD input/output (SDIO) card, and a multi-media control (MMC) card.

18. The interface system of claim 17, wherein the SDIO card comprises a radio frequency (RF) transceiver module and an antenna that communicates with the RF transceiver module, wherein the RF transceiver module is compliant with at least one of IEEE standards 802.11, 802.11a, 802.11b, 802.11g, 802.11h, 802.11n, 802.16, 802.20 and Bluetooth.

19. A host device, comprising:
a direct memory access (DMA) control module; and
a host control module that comprises
a communication module that communicates via packets with a peripheral device, wherein the packets include interrupt header portions and payload portions,
a DMA interface module that initiates predetermined secure digital command-response sequences in the DMA control module based on the interrupt header portions without interrupting the host control module until the predetermined secure digital command-response sequences are complete,
wherein the DMA control module transmits commands and receives responses from the peripheral device based on the predetermined secure digital command-response sequences, and
wherein the DMA control module interrupts the host control module after the peripheral device responds to the commands, and
an interrupt control module that communicates with the DMA control module and that selectively passes interrupts to the host control module when contents of memory do not match contents of a first register.

20. The host device of claim 19, further comprising the memory, wherein the command-response sequences include a plurality of descriptors that identify locations in the memory for the commands.

21. The host device of claim 20, wherein the DMA control module retrieves the commands based on the descriptors.

22. The host device of claim 21, wherein the commands are standard secure digital input/output (SDIO) commands.

23. The host device of claim 19, further comprising a secure digital (SD) control module, wherein the DMA and host control modules communicate with the peripheral device through the SD control module.

24. A method for operating an interface system, comprising:
receiving first data from a first memory of a peripheral device in a first register of a peripheral control module of a host device;
comparing contents of a first memory array in second memory of the host device to contents of the first register without interrupting non-memory processes of a host control module of the host device;
controlling transfers of second data from the first memory to the peripheral control module based on the comparison;
processing a secure digital input/output header to run an interrupt header sequence without interrupting the host control module until the interrupt header sequence is complete; and selectively passing interrupts to the host control module when the contents of the first memory do not match contents of the first register.

25. The method of claim 24, further comprising transferring the first data from the first memory to the peripheral control module when the contents of the first memory array match the contents of the first register.

26. The method of claim 24, further comprising controlling the transfers of second data in response to the interrupts, wherein the first data includes overhead data and the second data includes payload data.

27. The method of claim 24, further comprising selectively passing the interrupts from one of the peripheral control module, a direct memory access (DMA) control module that controls the comparing, and an interrupt control module that controls the interrupts.

28. The method of claim 24, further comprising implementing secure digital input/output (SDIO) communications within the peripheral control module.

29. The method of claim 24, further comprising defining a source memory address in the first memory,
a destination memory address in the second memory, and
a size of the first and second data to be transferred.

30. The method of claim 24, further comprising using secure digital input/output (SDIO) to transfer the first and second data between the peripheral device and the host device.

31. The method of claim 24, further comprising:
preparing the first memory array and a second memory array in the second memory, and
directing a DMA control module to communicate with the first and second memory arrays.

32. The method of claim 31, further comprising
providing a sequence of expected responses from the peripheral device, and
providing a sequence of commands to be executed by the peripheral device.

33. The method of claim 31, further comprising:
triggering an interrupt when the peripheral device includes a data packet to be read by the host device, and
servicing the interrupt by copying a first command in the second memory array to a second register in the peripheral control module.

34. The method of claim 33, wherein the peripheral device receives the first command, and responds to the first command with a response token.

35. The method of claim 34, further comprising:
sending the response token to the first register, and
triggering an interrupt that is serviced by the DMA control module in response to the response token.

36. The method of claim 32, further comprising:
receiving packets that include the first and second data in chunks of predetermined size, and
determining a length of the packets based on a number of data chunks over which the packets are to be read out of the peripheral device, wherein a last one of the commands at least partially refers to the length.

37. A method for interfacing, comprising:
transferring packets from a peripheral device to a direct memory access (DMA) control module, wherein the packets have interrupt header portions and payload portions;
initiating predetermined secure digital command-response sequences in the DMA control module based on the interrupt header portions;
transmitting commands and receiving responses from the peripheral device based on the predetermined secure digital command-response sequences without interrupting a host control module until the predetermined secure digital command-response sequences are complete;

notifying the host control module after the peripheral device responds to the commands; and selectively passing interrupts to the host control module when contents of memory do not match contents of a first register.

38. The method of claim 37, further comprising identifying locations in the memory with a plurality of descriptors for the commands that are in the predetermined secure digital command-response sequences.

39. The method of claim 38, further comprising retrieving the commands based on the descriptors.

40. The method of claim 39, further comprising implementing standard secure digital input/output (SDIO) commands via the commands.

41. The method of claim 37, further comprising including at least one of a secure digital (SD) card, a SD input/output (SDIO) card, and a multi-media control (MMC) card in the peripheral device.

42. The method of claim 41, further comprising including in the SDIO card a radio frequency (RF) transceiver module and an antenna that communicates with the RF transceiver module, wherein the RF transceiver module is compliant with at least one of IEEE standards 802.11, 802.11a, 802.11b, 802.11g, 802.11h, 802.11n, 802.16, 802.20 and Bluetooth.

* * * * *